(12) United States Patent
Naraparaju et al.

(10) Patent No.: US 10,837,918 B2
(45) Date of Patent: Nov. 17, 2020

(54) NON-DESTRUCTIVE CMAS-INFILTRATION CHARACTERIZATION OF THERMAL BARRIER COATINGS

(71) Applicants: Deutsches Zentrum für Luft-und Raumfahrt e.V, Cologne (DE); University of Central Florida Research Foundation, Inc., Orlando, FL (US)

(72) Inventors: Ravisankar Naraparaju, Cologne (DE); Uwe Schulz, Cologne (DE); Seetha Raghavan, Orlando, FL (US); Estefania Bohorquez, Orlando, FL (US)

(73) Assignees: Deutsches Zentrum für Luft-und Raumfahrt e.V, Cologne (DE); University of Central Florida Research Foundation, Inc., Orlando, FL (US)

( * ) Notice: Subject to any disclaimer, the term of this patent is extended or adjusted under 35 U.S.C. 154(b) by 96 days.

(21) Appl. No.: 15/934,556

(22) Filed: Mar. 23, 2018

(65) Prior Publication Data
US 2019/0293567 A1    Sep. 26, 2019

(51) Int. Cl.
 *G01J 3/44* (2006.01)
 *G01N 21/91* (2006.01)
 (Continued)

(52) U.S. Cl.
 CPC ............. *G01N 21/91* (2013.01); *G01N 21/65* (2013.01); *F01D 5/288* (2013.01);
 (Continued)

(58) Field of Classification Search
 CPC .............. F01D 5/288; F05D 2230/313; F05D 2230/72; F05D 2230/90; F05D 2260/80;
 (Continued)

(56) References Cited

U.S. PATENT DOCUMENTS

| | | | | |
|---|---|---|---|---|
| 7,535,565 B1 * | 5/2009 | Viertl | ................... | G01N 21/718 356/318 |
| 2008/0253428 A1 * | 10/2008 | MacDougall | .......... | G01K 11/32 374/137 |

(Continued)

OTHER PUBLICATIONS

Estefania Bohorquez et al., Investigation of the Effects of CMAS-infiltration in EB-PVD 7% Yttria-Stabilized Zirconia via Raman Spectroscopy; in: AIAA/ASCE/AHS/ASC Structures, Structural Dynamics, and Materials conference 2018: Held at the AIAA Scitech Forum 2018: Kissimmee, Florida, USA, 8-12 Jan. 2018/ American institute of Aeronautics and Astronautics. Red Hook, NY: Curran Associates, Inc., 2018.S. pp. 117-122.

*Primary Examiner* — Sunghee Y Gray
(74) *Attorney, Agent, or Firm* — Seth L. Hudson; Clements Bernard Walker

(57) ABSTRACT

The present invention provides a non-destructive method of characterizing CMAS infiltration and CMAS assisted damage in thermal barrier coatings (TBCs). Such approach is especially relevant for determining the lifetime of coatings on e.g. turbines or parts of the turbines such as blades or in-liners of the combustion chambers. The turbines can be gas turbines or high-pressure turbines or others and may be stationary or used for example in aviation.

16 Claims, 4 Drawing Sheets

(51) Int. Cl.
*G01N 21/65* (2006.01)
*F01D 5/28* (2006.01)

(52) U.S. Cl.
CPC ...... *F05D 2260/80* (2013.01); *F05D 2260/83* (2013.01); *F05D 2300/611* (2013.01)

(58) Field of Classification Search
CPC ........... F05D 2260/83; F05D 2300/611; G01N 2021/8427; G01N 2021/8472; G01N 21/65; G01N 21/8422; G01N 21/91
USPC ........................................................ 356/301
See application file for complete search history.

(56) References Cited

U.S. PATENT DOCUMENTS

| | | | |
|---|---|---|---|
| 2009/0142525 A1* | 6/2009 | Boutroy | C23C 16/045 |
| | | | 428/35.7 |
| 2014/0022532 A1* | 1/2014 | Sackett | G01J 3/0227 |
| | | | 356/51 |
| 2016/0376691 A1 | 12/2016 | Wadley et al. | |
| 2017/0009034 A1* | 1/2017 | Suzuki | B32B 27/306 |
| 2017/0165708 A1* | 6/2017 | Sivaramakrishnan | F01D 5/288 |

* cited by examiner

Figure 1: Schematic TBC Infiltrated by CMAS

NON-DESTRUCTIVE CMAS-INFILTRATION CHARACTERIZATION OF THERMAL BARRIER COATINGS

STATEMENT REGARDING GOVERNMENT RIGHTS

This invention was made with government support under contract numbers DMR1337758 and 1460045 awarded by the National Science Foundation. The government has certain rights in the invention.

FIELD OF THE INVENTION

The present invention provides a non-destructive method of characterizing CMAS infiltration and CMAS assisted damage in thermal barrier coatings (TBCs). Such approach is especially relevant for determining the lifetime of coatings on e.g. turbines or parts of the turbines such as blades or in-liners of the combustion chambers. The turbines can be gas turbines or high-pressure turbines or others and may be stationary or used for example in aviation.

BACKGROUND OF THE INVENTION

The need for more competitive, highly efficient engines requires higher operating temperatures. Such need, has initiated an entire scientific effort and the release of many new technological inventions. Among them, is the development of super alloys, which can tolerate higher temperatures and high stresses, along with TBCs on top of the alloys. In general, most of the TBCs on turbine blades are deposited by means of electron beam physical vapor deposition (EB-PVD) method which allows the formation of the characteristic inter-columnar porosity allowing for thermal expansion mismatch, during thermal cycling caused by the typical inflight operation scenarios. In addition, another vastly used deposition technique is atmospheric plasma spray (APS) which is known for its splat like structure and porosity with cracks generally running parallel to the interface.

As shown on FIG. 1 a TBC system consists of a metallic substrate (most commonly a nickel based superalloy) providing structural strength, a bond coat (providing oxidation resistance), a ceramic topcoat 7 wt. % yttria stabilized zirconia (7YSZ), and a thermally grown oxide that forms between the YSZ and the bond coat due to high temperature oxidation. The lifetime of TBCs can be shortened when CMAS deposits on top of the 7YSZ coating. The extreme temperatures within the jet-engine turbine cause CMAS deposits to melt and infiltrate open porosity of the EB-PVD coating resulting in channel cracks and sub-surface delamination. $CaO-MgO-Al_2O_3-SiO_2$ [(] (CMAS) has been found to be a life limiting factor for the ceramic thermal barrier coatings (TBCs).

The deposition of 7YSZ coatings by EB-PVD allows a columnar microstructure that result in superior heat protection and compliance properties necessary for jet aircraft engines. This columnar microstructure, however, is especially susceptible to CMAS infiltration due to capillary forces which causes severe mechanical stresses within the TBC upon cooling (toughness of TBCs increases), subsequently leading to a crack formation and TBC spallation. In addition, when CMAS is molten it reacts with the TBC material and forms new phases. This also causes a complete change in the porous morphology of the thermal barrier coatings. As CMAS reacts with the 7YSZ layer, Yttria dissolution into the melt takes place. In the affected areas of the 7YSZ where significant Y loss has occurred, a phase change from tetragonal $t-ZrO_2$ to monoclinic $m-ZrO_2$ leads to a volume change. The CMAS-infiltration also stiffens the TBC which causes a large increase in stresses, leading subsequently to spallation of the TBC and loss of the protective function. Since TBC coated parts are internally cooled via bleed in air, a temperature gradient across the coating thickness exists. As a consequence the TBC gets infiltrated by CMAS only up to a certain depth. The exact infiltration depth depends on many parameters such as porosity of the TBC coating, extent of the temperature gradient in the part, the composition of the melt and oxide material, the amount of CMAS ingestion during the flights and the engine operational time in the dust laden environments. It has been found out that the CMAS infiltration depth is directly linked to the life time of the TBC coating. So far this infiltration and damage depth can only be obtained by preparation of a metallographic cross section, thereby destroying the part. A method to measure TGO stress non-invasively and relate this to coating lifetime has been developed but this is ineffective in the presence of CMAS due to the inability to mitigate the contribution by the CMAS signal or identify the changes by CMAS infiltration with respect to depth.

The problem of CMAS infiltration does not only occur in thermal barrier coatings but also in environmental barrier coatings. In cases where e.g. SiC is used instead of e.g. a nickel based super alloy as material, there is no absolute need for thermal barrier coating, as SiC has a high thermal stability. However, these SiC composites are susceptible to water vapor assisted damage and hence needs to be protected by so called environmental barrier coatings.

Also such an environmental barrier coating might then in use will be affected by CMAS, in a similar way as described for the thermal barrier coatings above.

Thus, until today it is necessary destroying a coated part for analysis whether the coating is still sufficient for protection or already affected by CMAS. Therefore, it is only possible to estimate the lifetime of e.g. turbine blades in aero planes based on statistical analysis of the coatings, where the analysis destroys the turbine or parts thereof.

BRIEF SUMMARY OF THE INVENTION

Hence, There is a need for a non-destructive technique for characterizing the infiltration of CMAS and especially the depth of infiltration of CMAS in TBCs. Knowing the infiltration depth would be the key in evaluating the lifetime, assessing the damage level, depth and defining the need for partial or full repair of the TBC coating. Such a non-destructive technique would allow for better understanding of CMAS infiltration on the one hand side but also enhances the safety of the coatings once they come in contact with CMAS.

Surprisingly, it has been found by the inventors of the present invention that Raman Spectroscopy enables the investigation of the effects of CMAS infiltration in TBCs. Therefore, the object of the present application is solved by a method as defined in claim 1 and the use according to claim 14. Preferred embodiments are mentioned in the dependent claims.

BRIEF DESCRIPTION OF THE DRAWINGS

The present invention is illustrated and described herein with reference to the drawing, in which like reference numbers denote like method steps and/or system components, respectively, and in which.

DETAILED DESCRIPTION OF THE INVENTION

Figure 1:
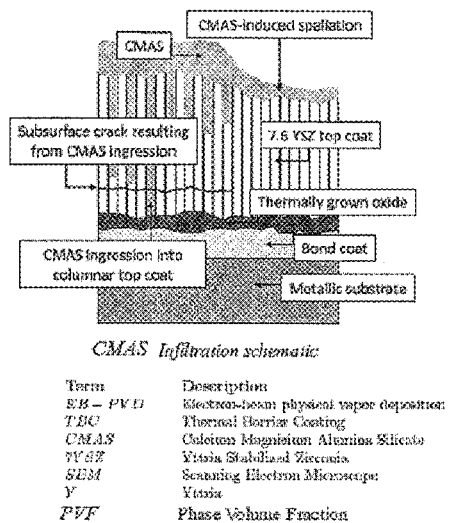
FIG. 1 is a schematic of a thermal barrier coating infiltrated by CMAS.

Thus, the present application provides a non-destructive method of characterizing CMAS infiltration in barrier coatings comprising:
i. providing means with a barrier coating after potential CMAS-infiltration,
ii. analyzing the means with Raman mapping, and
iii. determining the concentration of a phase present in the barrier coating that undergoes a phase change initiated by CMAS and that is detectable by Raman technique.

Surprisingly, it has been found out that Raman mapping enables the investigation of effects of CMAS infiltration in barrier coatings and especially TBCs non destructively. For a special type of TBCs the inventors of the present application have shown that their investigation of the effects of CMAS infiltration in EB-PVD 7% yttria stabilized zirconia (7YSZ) via Raman Spectroscopy at the American Institute of Aeronautics and Astronautics (AIAA) Scitech Forum Conference in Kissimmee on 8 Jan. 2018.

Surprisingly, it has been found that Raman Microscopy could be used to obtain the monoclinic phase peak position and change in the intensity from TBC samples infiltrated with CMAS, as means of CMAS infiltration characterization. The monoclinic phase peak position of the thermal barrier coating, here 7YSZ, appears in areas been affected by CMAS.

The as coated 7YSZ has a tetragonal state. CMAS infiltration leads to phase change to the monoclinic state (tetragonal and monoclinic state of $ZrO_2$ in the present case) of the barrier coating. In general, it has surprisingly be found out that a phase change initiated by CMAS by any phase present in the barrier coating enables the characterization of CMAS-infiltration by Raman technique under the provision that the phase change is detectable by Raman technique. Therefore, not only the phase change for 7YSZ can be detected, but any other phase change in a TBC such as gadolinium zirconate (GZO), pure Yttria, Yttria rich zirconia and alumina etc or Rare Earth Silicate (RE) EBCs such as Yttrium mono silicate (YMS), Yttrium disilicate (YDS), Ytterbium silicate/hafnate initiated by CMAS. For example all the aforementioned TBC and EBC materials do react with the CMAS and form stable apatite phase with a chemical formula of $(Ca,RE)_4 (RE,Zr)_6(SiO_4)_6O_2$ or a Garnet phase with a chemical formula of $(Ca, RE, Zr)_3(Zr,Ti,Mg,Al,Fe)_2(Si,Al,Fe)_3O_{12}$.

In a preferred embodiment, the Raman mapping is a 3D Raman mapping.

Raman Spectroscopy is a nondestructive technique used to investigate vibrational inelastic scattering which can be linked to specific materials like a fingerprint for providing important information such as its phase, stress state etc. Introduction of the present analysis technique has a huge advantage over the usage of any destructive technique with respect to its CMAS infiltration depth/interaction identification. The currently preferred analysis technique consists of 3D Raman mapping, a combination of two known Raman techniques:
1. depth-profiling and x & y mapping. In the depth-profiling method the Raman spectra are collected point-by-point along the z-axis (normal to the surface of the sample).
2. Raman mapping consists in scanning (point-by-point) some selected area of the sample in the x & y plane.

In both techniques, the Raman spectra should be collected in properly chosen range of wavelengths covering the selected band characteristic for the component of interest. Most important finding in this application is "correlating the phase change from the depth scans to the CMAS infiltration damage" using the combination of both above techniques 1 and 2.

Therefore, in a preferred embodiment, the non-destructive method of the present invention comprises:
i. providing a metallic substrate with a thermal barrier coating after potential CMAS-infiltration,
ii. analyzing the metallic substrate with Raman mapping, and
iii. determining the concentration of a phase present in the barrier coating that undergoes a phase change initiated by CMAS-infiltration and that is detectable by Raman technique and
iv. correlating the phase change of any phase present in the coating material that undergoes a phase change initiated by CMAS-infiltration and that is detectable by the Raman technique from the depth of the samples to the CMAS infiltration damage.

The barrier coating can be a thermal barrier coating (TBC) or an environmental barrier coating (EBC). The TBC is preferably 7YSZ or any TBC system that gives that undergoes a phase change initiated by CMAS and that is detectable by the Raman technique. The EBC is preferably rare earth (RE) monosilicate or disilicate or any EBC system that gives that undergoes a phase change initiated by CMAS and that is detectable by the Raman technique.

In a preferred embodiment where the barrier coating is a TBC and 7YSZ is the TBC, the method of the present invention comprises therefore the following steps:
i. providing a metallic structure with a thermal barrier coating after potential CMAS-infiltration,
ii. analyzing the metallic structure with Raman mapping, and
iii. determining the concentration of tetragonal and monoclinic phase peaks of 7YSZ and thereby collecting information about the phase change of 7YSZ due to the CMAS interaction with 7YSZ coating.

Especially preferred, the method comprises the following steps:
i. providing a metallic structure with a TBC after potential CMAS-infiltration,
ii. analyzing the metallic structure with Raman mapping, and
iii. determining the concentration of tetragonal and monoclinic phase peaks of 7YSZ and thereby collecting information about the phase change of 7YSZ due to the CMAS interaction with 7YSZ coating and iv. correlating the phase change of the TBC from the tetragonal phase to the monoclinic phase to the CMAS infiltration depth in the coating to the CMAS infiltration damage.

In cases where the barrier coating is a EBC, the steps are accordingly, but that the phase change of the EBC initiated by CMAS is determined in step iii. and correlated with the CMAS infiltration depth in step iv.

The biggest advantage of this 3D scanning procedure is its novel technique of enabling a visualization of the complete infiltration within a coating non-invasively from Raman emissions taken over a volume of the coating. The coating composition and its evolution relevance to the CMAS composition are provided point by point and translated into infiltration depth/damage. This invention claims to provide 3D plots obtained from a specific Raman range e.g. monoclinic phase appearance.

Second great advantage is its capability to be used to plot multiple phases often distinctly. For example, if pure CMAS signal is obtained, then the peaks concerning CMAS can be selected and plotted with respect to depth also providing information about how deep CMAS has infiltrated within the coating.

No special sample preparation is required. Unlike SEM or other known techniques, Raman can be used on as-deposited coating with no preliminary destructive sample preparation.

Major advantage is that results can be linked to stress measurements within the coating. Any specific peak shift can be used as stress measurements and can be plotted in 3D making it possible to see the stresses within the coating and how CMAS infiltration has affected it.

As long as the monoclinic phase (which is characteristic for CMAS induced phase change) peak positions can be identified, along with its specific stress measurement procedure, it is possible to use this system on as EB-PVD, APS and PS-PVD coatings. The measurement can be done on real parts non-destructively and with portable instrumentation to assess status of damage by deposits. This is so far not possible with any other known technique on this large scale samples.

The means preferably consists essentially of a high temperature resistant material. Consists essentially within the meaning of the present application defines that the means consist at least to 60% by weight or more of the high temperature resistant material, preferably at least 70% by weight, especially at least 75% by weight, preferred at least 80% by weight or at least 85% by weight. Especially preferred are the cases where the means consists to 90% by weight or 95% and preferably 100% by weight of the temperature resistant material.

The temperature resistant material is for example selected from Ni-based superalloys or oxide-based or SiC-based ceramic matrix composites. The means are for example a turbine, gas turbine, or parts of the (high-pressure) gas turbine, such as turbine blade, or inliner of a combustion chamber.

In the followings example, the present invention is discussed in more detail that without limiting the present invention to this example.

EXAMPLES

A) Reference Example

One synthetic CMAS powder derived from real engine deposits (22 CaO, 8 MgO, 18 $Al_2O_3$, 40 $SiO_2$, 10 FeO and 2 $TiO_2$, all in wt. %) was placed on top of EB-PVD 7YSZ coating (400 μm thick coating on alumina substrate) and was subjected for infiltration test at 1250° C. for 10 hours. SEM cross sectional micrograph of the infiltrated 7YSZ coating is presented in FIG. 2. EDS elemental mapping was done to confirm the presence of Ca, Si elements which are characteristic of the CMAS. It was found out that after 10 h total 7YSZ layer was infiltrated with CMAS and a lot of reaction took place on top and bottom part of the layer.

Figure 2:
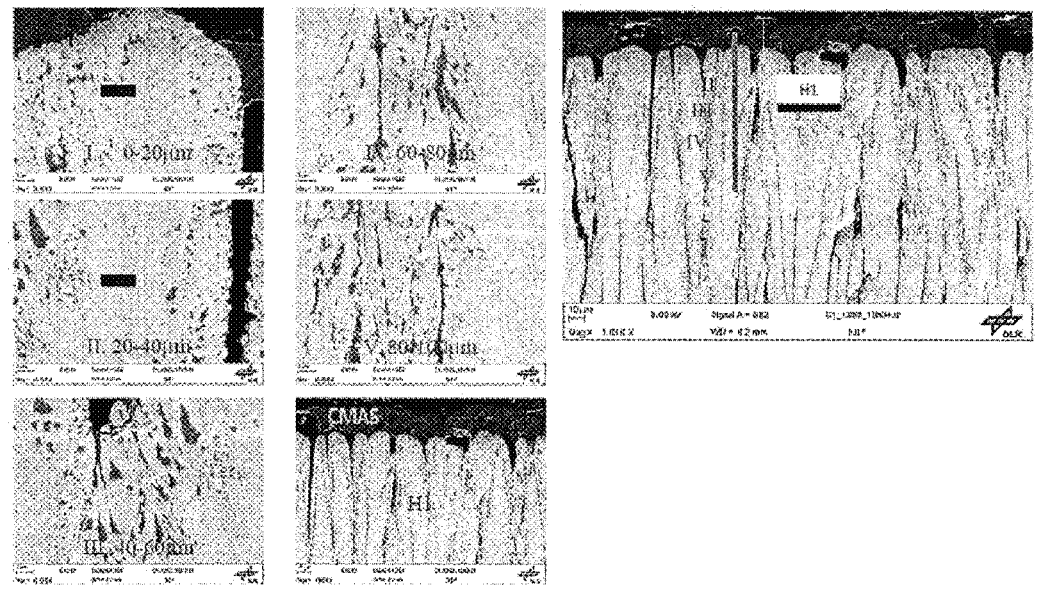
FIG. 2 is an SEM cross-sectional micrograph of an infiltrated 7YSZ coating.
Figure 3:
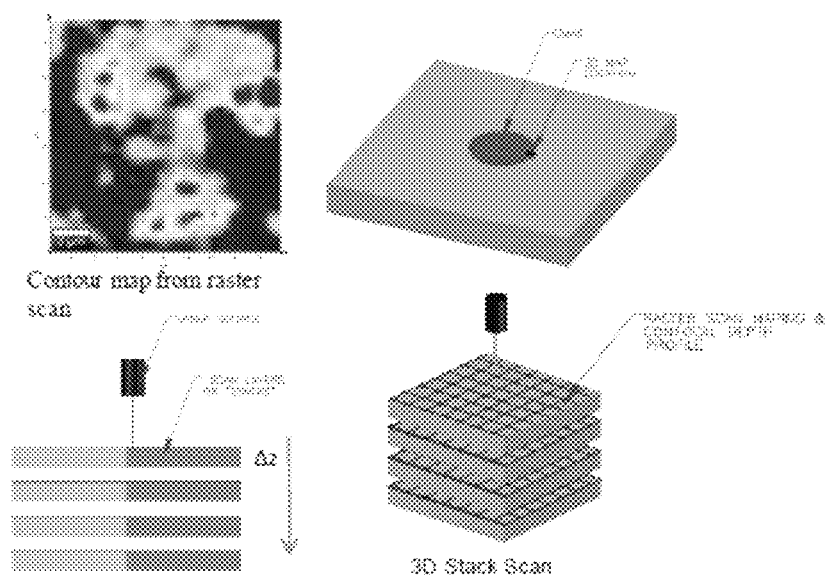
FIG. 3 illustrates a contour map from raster scan and 3D stack scan.

FIG. 2 features of upper interaction zone of 7YSZ with CMAS which is then divided into 0-20 μm thick areas. From closer examination of the columnar tips, the columns are no longer in normal condition instead, CMAS reacted with the coating and column tips lost their shape. Lot of phase transformation from t-m could be observed depending on the shape of the formed phases (globular particles). However this damage cannot be observed with any existing non-destructive technique and requires cutting the part or sample which ultimately prevents the further usage or repair. In reality if any in-service blade has to be analysed for its CMAS related damage, it has to go through destructive techniques such as SEM. The currently well-known and often performed Boroscopy on flight engines and gas turbines gives only a glimpse of external damage rather than microstructural damage to the coating.

So there exists a big technological void where such novel non-destructive evaluation methods are necessary to fill in and that can provide non-destructively information on the local depth of damage in TBCs by deposits.

B) Example According to the Present Invention

Figure 4:
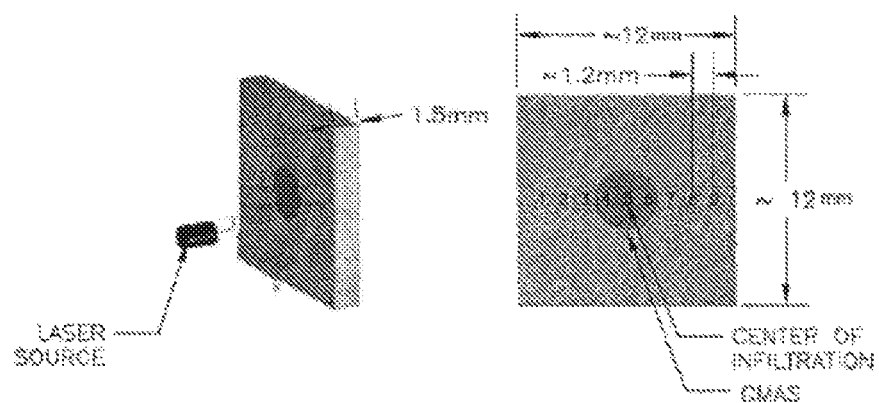
FIG. 4 illustrates the CMAS deposited at the center of a sample and nine point scans collected across the sample covering both, the deposited and non-deposited part of the coating.

Raman Spectra were collected using an Alpha 300RA, WITec Confocal Raman microscope across each sample. The sample was prepared as explained for the reference example above. A He:Ne 532 nm laser source and a 20× objective were used. To keep consistency, collection parameters of 10 accumulations and a 2 second acquisition time were kept for all samples. Given that CMAS is deposited only at the center of the sample, nine point scans were collected across the sample covering both, deposited and non-deposited part of the coating as shown in FIG. 4.

Figure 5B:
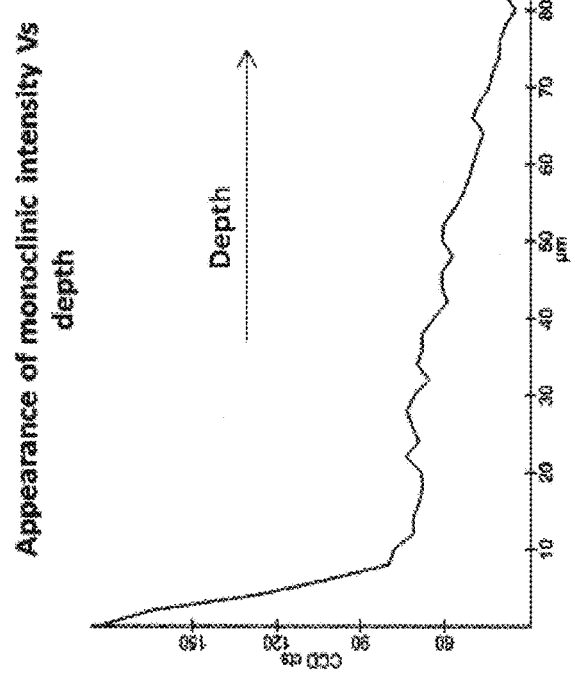
FIG. 5B illustrates the intensity of the monoclinic peak at 182 $cm^{-1}$ vs. the depth of the coating showing highest intensity values near the surface of the coating
Figure 5A:
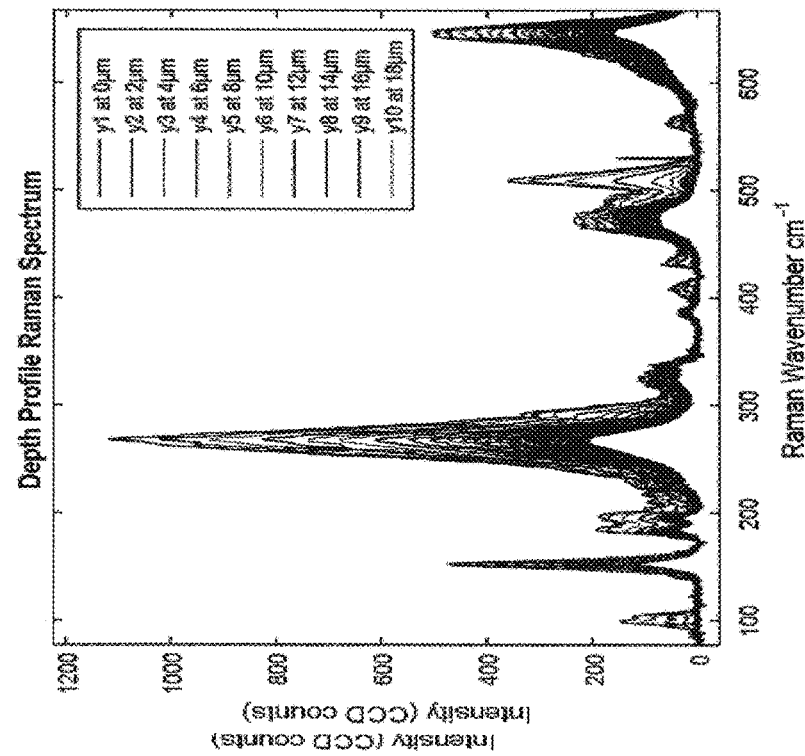
FIG. 5A illustrates Raman spectra as function of depth in the coating.

The monoclinic peak position at 182 $cm^{-1}$ was considered as the standard phase identification peak. The intensity of the peaks can be correlated with the amount of monoclinic presence along the depth of the sample. FIG. 5A shows Raman spectra as function of depth in the coating. On the left side, a Z-line scan is taken at the center of infiltration with the step size of 2 μm up to 18 μm down. The right diagram (FIG. 5B) shows the intensity of the monoclinic peak at 182 $cm^{-1}$ vs. the depth of the coating showing highest intensity values near the surface of the coating.

The analysis obtained via 3D Raman spectra according to the present invention is in accordance with the results obtained via SEM analysis shown in FIG. 2 showing that Raman spectroscopy and especially 3D Raman mapping provides for the first time for a non-destructive method of characterizing the infiltration in barrier coatings.

The technical use for this invention is service aspect for example of high pressure turbine blades, vanes, combustor liners and chambers. It can be used for example by jet engine users, maintenance companies, research and development by OEMs and research organizations. Safety in aeronautics might increase, as there might be no guess about the thermal barrier coatings but there is a non-destructive method of characterizing turbines and parts thereof.

The present application may therefore be summarized with the following main items:

1. Non-destructive method of characterizing CMAS-infiltration in thermal or environmental barrier coatings comprising:
   i. providing a metallic structure with a barrier coating after potential CMAS-infiltration,
   ii. analyzing the metallic structure with Raman mapping, and
   iii. determining the concentration of any phase present in the barrier coating that undergoes a phase change initiated by CMAS-infiltration and that is detectable by Raman technique.
2. Method according to item 1, wherein the Raman mapping is a 3D Raman mapping.
3. Method according to item 2 wherein the 3D Raman mapping consists of a) surface Raman mapping and
   b) depth-profiling and x and y mapping.
4. Method according to item 3 wherein step a) consists in scanning the surface of the sample in an x and y plane.
5. Method according to item 3 or 4 wherein step b) is a collection of Raman spectra point by point along an axis normal to the surface of the sample (z-axis).
6. Method according to any of items 1 to 5 further comprising the step of
   iv. correlating the phase change of the barrier coating of any phase present in the coating material that undergoes a phase change initiated by CMAS-infiltration and that is detectable by the Raman technique from the depth of the samples to the CMAS-infiltration.
7. Method according to any of items 1 to 6 wherein the means consists essentially of a high-temperature resistant material.
8. Method according to item 7 wherein the high-temperature resistant material is selected from Ni-based superalloys, oxide-based or SiC-based ceramic matrix composites.
9. Method according to any of items 1 to 8 wherein the metallix substrate is located on is a turbine, gas turbine, high- or low pressure turbine, or parts of the gas turbine, such as turbine blades, vanes, tiles, transition pieces, walls, or parts of a combustion chamber.
10. Method according to any of items 1 to 9 wherein the barrier coating is a thermal barrier coating or an environmental barrier coating.
11. Method according to item 10, wherein the thermal barrier coating is a 7% Yttria-Stabilized-Zirconia coating or any TBC system that gives that undergoes a phase change initiated by CMAS and that is detectable by the Raman technique.
12. Method according to item 1 or item 11, wherein step iii is:
   iii. determining the concentration of tetragonal phase peaks and monoclinic phase peaks of 7YSZ damaged by CMAS and thereby collecting information about the phase change initiated by CMAS from the tetragonal phase to the monoclinic phase.
13. Method according to item 6 or item 11, wherein step iv is:
   iv. correlating the phase change from the tetragonal phase to the monoclinic phase in 7YSZ in the depth of the samples to the CMAS infiltration damage.
14. Method according to item 10 wherein the environmental barrier coating is selected from rare earth (RE) mono-silicate, or disilicate.
15. Use of the method according to any of items 1 to 14 to monitor the damage evolution of barrier coatings, especially thermal barrier coatings, based on the detection of the phase change from tetragonal to monoclinic phase in 7YSZ or by any other phase change in different materials that is initiated by CMAS.
16. Use according to item 15 wherein the monitoring of the phase change is made with respect to the depth of the barrier coating.

The invention claimed is:

1. A non-destructive method of determining any CaO—MgO—$Al_2O_3$—$SiO_2$ (CMAS) infiltration in barrier coatings on a metallic substrate comprising:
   i. providing a metallic substrate coated with a barrier coating potentially exposed and infiltrated by CMAS,
   ii. analyzing the metallic substrate and barrier coating with Raman mapping, and
   iii. determining if the barrier coating has experienced a phase change initiated by infiltration of CMAS of the barrier coating that is detectable by the Raman mapping.
2. The method according to claim 1, wherein the Raman mapping is 3D Raman mapping.
3. The method according to claim 2 wherein the 3D Raman mapping consists of a) surface Raman mapping and
   b) depth-profiling and x and y mapping.
4. The method according to claim 3 wherein step a) consists in scanning the surface of the sample in an x and y plane.
5. The method according to claim 3 or 4 wherein step b) is a collection of Raman spectra point by point along an axis normal to the surface of the sample (z-axis).
6. The method according to claim 1 further comprising the step of
   iv. correlating the phase change of the barrier coating of any other phase present in the coating material that undergoes a phase change initiated by CMAS and that is detectable by the Raman technique from the depth of the samples to the CMAS infiltration damage.
7. The method according to claim 6, wherein step iv is:
   iv. correlating the phase change from the tetragonal phase to the monoclinic phase in 7YSZ in the depth of the samples to the CMAS infiltration damage.
8. The method according to claim 1 wherein the means consists essentially of a high-temperature resistant material.
9. The method according to claim 8 wherein the high-temperature resistant material is selected from Ni-based superalloys or oxide-based or SiC-based ceramic matrix composits.
10. The method according to claim 1 wherein the metallic substrate is located on a turbine, gas turbine, high-pressure turbine, or parts of the high-pressure gas turbine, such as turbine blade, or inliner of a combustion chamber.
11. The method according to claim 1 wherein the barrier coating is a thermal barrier coating or an environmental barrier coating.
12. The method according to claim 11, wherein the thermal barrier coating is a 7% Yttria-Stabilized-Zirconia coating or any TBC system that gives that undergoes a phase change initiated by CMAS and that is detectable by the Raman technique.
13. The method according to claim 11 wherein the environmental barrier coating is selected from rare earth (RE) mono-silicate, or disilicate.
14. The method according to claim 1 wherein step iii is:
   iii. determining the concentration of tetragonal phase peaks and monoclinic phase peaks of 7YSZ damaged by CMAS and thereby collecting information about the phase change initiated by CMAS from the tetragonal phase to the monoclinic phase.

15. The method according to claim 1 wherein the damage evolution of barrier coatings is monitored based on the detection of the phase change.

16. The method according to claim 15 wherein the monitoring of the phase change is made with respect to the depth of the barrier coating.

* * * * *